United States Patent [19]

Lester

[11] Patent Number: 5,156,185

[45] Date of Patent: Oct. 20, 1992

[54] POSITION INDICATOR APPARATUS FOR RISING STEM VALVE

[75] Inventor: Leo M. Lester, Medford, Mass.

[73] Assignee: Asahi/America, Inc., Mass.

[21] Appl. No.: 790,247

[22] Filed: Nov. 8, 1991

[51] Int. Cl.[5] ............................................. F16K 37/00
[52] U.S. Cl. ..................................... 137/554; 251/61.1
[58] Field of Search ...................... 137/554; 251/61.1

[56] References Cited

U.S. PATENT DOCUMENTS

| 1,638,325 | 8/1927 | Davis | 137/554 |
| 3,414,012 | 12/1968 | Webb | 137/554 |
| 3,894,557 | 7/1975 | Impett | 137/554 |
| 3,923,475 | 12/1975 | Stenzel et al. | 137/554 |
| 4,338,965 | 7/1982 | Garnjost et al. | 137/554 |
| 4,625,758 | 12/1986 | Murray | 137/554 |
| 4,805,665 | 2/1989 | League | 137/554 |

FOREIGN PATENT DOCUMENTS 2108620  8/1972  Fed. Rep. of Germany ...... 137/554

Primary Examiner—A. Michael Chambers
Attorney, Agent, or Firm—Anthony J. Casella; Gerald E. Hespos

[57] ABSTRACT

A position indicator apparatus is provided for rising stem valves. The position indicator apparatus includes a switch having a rotatable switch post. The switch is operatively connected to a power source and to a signal, such that a circuit to the signal is selectively completed or broken depending upon the rotational orientation of the switch post. The switch is rigidly mounted in a selected position relative to a valve housing. A connecting beam extends from the switch post to the valve stem such that movement of the valve stem into or out of the valve housing causes a rotation of the switch post to complete the circuit to the signal for certain positions of the valve stem and to break the circuit to the signal for other positions of the valve stem.

15 Claims, 2 Drawing Sheets

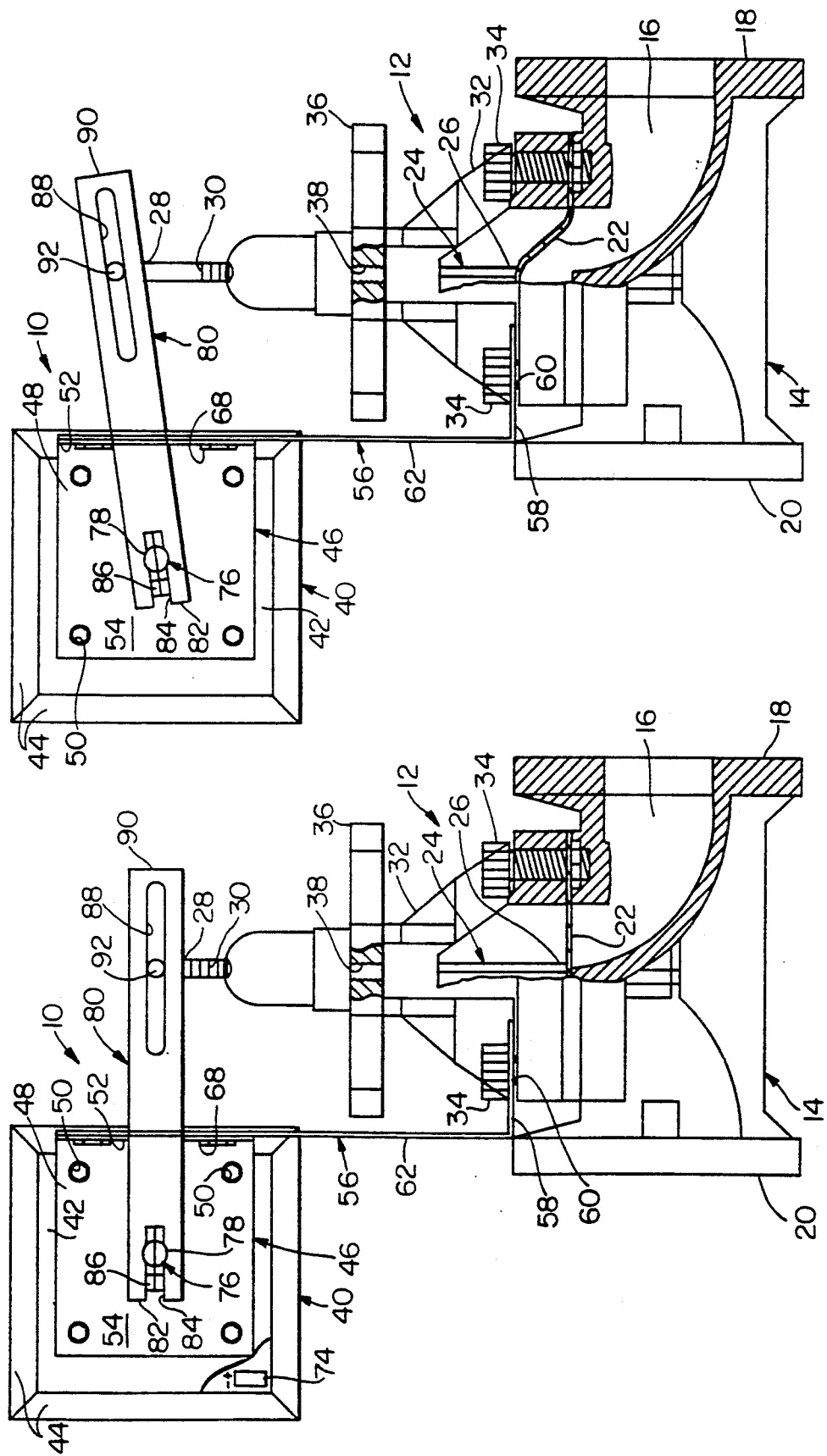

POSITION INDICATOR APPARATUS FOR RISING STEM VALVE

BACKGROUND OF THE INVENTION

Fluid control valves include a housing having a fluid flow passage therein and a valving member that is movable relative to the housing to selectively block or open the fluid flow passage. The valving member is operatively connected to a valve stem which extends through the housing. A portion of the valve stem external of the prior art valve body is engaged by an actuator. Rotation of the actuator generates movement of the valving member to block or open the fluid flow passage.

Valve stems on certain prior art valves are threaded and engage threads in the actuator on the housing. Rotation of the actuator causes the valve stem to translate along its axis and relative to the valve housing. This axial translation of the valve stem generates the movement of the valving member to open or block the fluid flow passage in the prior art valve housing. In particular, a translation of the valve stem out of the valve housing will open the fluid flow passage. Conversely, a translation of the valve stem into the prior art valve housing will close the fluid flow passage. Prior art valves having a valve stem that translates relative to the valve housing often are referred to as rising stem valves.

One type of rising stem valve is a diaphragm valve. The valving member of a diaphragm valve is a flexible material, or diaphragm, that is selectively moved by the valve stem to regulate the size of an opening in the fluid flow passage from a fully closed position to a fully opened position. The diaphragm also functions to the separate the valve stem and other moving components of the valve from the flow of fluid. Diaphragm valves, therefore, are widely used in environments where the fluid flowing through the valve is particularly corrosive or abrasive and is likely to damage the operative components of the valve. The valve stem of a prior art diaphragm valve extends from the diaphragm and through the valve housing. A portion of the valve stem intermediate its length includes an array of external threads. The prior art diaphragm valve further includes an actuator, such as a hand wheel. The prior art actuator typically includes an array of internal threads which threadedly engaged stem. In this typical prior art diaphragm valve, the actuator is rotatable relative to the housing, but is axially fixed in the housing relative to the axis of rotation of the actuator. Consequently, rotation of the actuator causes the prior art valve stem to translate along its axis.

The amount of translation for each rotation of the actuator in the prior art diaphragm valve is determined by the pitch of the thread on the valve stem. In some instances several rotations of the actuator are required to translate the valve stem sufficiently to move the diaphragm from the fully closed position to the fully opened position. The relative position of the diaphragm in the prior art diaphragm valve is not readily visually detectable in the prior art valve. In particular, it is difficult to determine whether the prior art diaphragm valve is in a fully closed position, a fully opened position or some position therebetween. In view of this inherent problem, prior art diaphragm valves often are provided with a sight glass which encloses the end of the valve stem external of the valve housing. The sight glass is provided with graduated markings which are intended to correspond to the relative axial position of the valve stem. Thus, a technician can visually align the axial end of the valve stem with the graduated markings on the sight glass to determine whether the diaphragm is in the fully open position, the fully closed position or some position therebetween.

The graduated sight glass on prior art diaphragm valves include several short comings. First, sight glasses are very difficult to observe from any significant distance. Second, the interpretation of the sight glass readings vary significantly in accordance with the angle of viewing. Third, the sight glass can become soiled after even a short period of use in an industrial facility, thereby making any reading virtually impossible. Fourth, it often is undesirable or unsafe for technicians to be moving into close proximity to the valve for making the visual inspection of the sight glass. In this latter regard, the need to periodically inspect a sight glass to check a relative position of a valve often can offset the efficiencies that can be achieved with automatic valve actuators.

The prior art includes several other types of rising stem valves that suffer from the same deficiencies. For example, some gate valves include a rising stem. A gate valve includes a valving member that is a generally planar disk or plate that can be moved in its plane into our out of the fluid flow passage of the valve housing. The plate or valve disk may be fixedly mounted to one end of a valve stem. A hand wheel or other such actuator similar to that described for the diaphragm valve may be mounted external of the valve housing and threadedly engaged with the valve stem. Rising stem gate valves suffer from the same inefficiencies as the above described rising stem diaphragm valves in that the relative position of the valving member cannot easily be determined.

Some prior art globe valves also include a rising stem. These prior art rising stem globe valves also suffer from the same inefficiencies as the above described prior art diaphragm valve in that the relative position of the globe valving member cannot readily be visually determined.

In view of the above, it is an object of the subject invention to enable an efficient determination of the relative position of the valve member in a rising stem valve.

It is another object of the subject invention to provide a position indicator for a rising stem valve that enables accurate determination of the valving member position from a remote location.

It is another object of the subject invention to provide a position indicator for a rising stem valve that can be adapted to different size valves.

Still another object of the subject invention is to provide a position indicator for a rising stem valve that avoids the need to employ a graduated sight glass.

SUMMARY OF THE INVENTION

The subject invention relates to a position indicator apparatus which positively identifies the position of a valving member within a rising-stem fluid control valve, such as a diaphragm valve, a gate valve or a globe valve. The apparatus of the subject invention utilizes the linear movements of the valve stem on a rising stem fluid control valve to positively indicate the position of the valving member within the valve housing.

The position indicator apparatus of the subject invention includes a mounting bracket for mounting to the housing of a rising stem valve. A portion of the mounting bracket may be configured to extend substantially parallel to the valve stem. The bracket may be adjustable to enable efficient mounting on each of a plurality of differently dimensioned valve housings. Alternatively, the bracket may be formed from a plurality of components, with selected components being universally applicable to all rising stem valves, but other components being dimensioned for mounting to a particular rising stem valve.

The position indicator apparatus of the subject invention further includes signaling means mounted to the bracket and supported in selected spaced relation to the valve stem for generating a signal in response to selected movements of the valve stem. The signaling means may comprise a switch means that is electrically powered by either an internal power source or an external power source. The signaling means may further be operative to generate an audio signal, a visual signal or an electrical signal which can be transmitted to a remote location, such as a control panel. A visual signal that may be generated by the position indicator apparatus may comprise at least one electrically powered light which may be lit in response to selected positions of the switch means and which may be turned off in response to other positions thereof. Plural signalling lights may be operatively connected to the switch means for indicating each of the plural positions of the valving member (e.g. a green light for fully open and a red light for fully closed).

The position indicating apparatus of the subject invention further includes connecting means for connecting the switch means to the valve stem of the rising stem fluid control valve. The connecting means is operative to transmit movements of the valve stem to the switch means. In a preferred embodiment, as explained further herein, the switch means is rotatable and enables different signals to be generated in response to the particular rotational orientation thereof. In this preferred embodiment, the connecting means is rigidly mounted to the switch means and is pivotably and/or slidably connected to the valve stem. Thus, movement of the valve stem will generate a pivoting movement of both the connecting means and the switch means. The switch means will be operative to enable a signal to be generated in response to a selected range of movement of the valve stem which may be indicative of, for example, a fully opened condition of the valve. Alternatively, the switching means may be operative to generate a signal in response to a position of the valve stem indicative of a fully closed position of the valve.

The position indicator apparatus avoids the need for a technician to be close to the valve to accurately assess the disposition of the valving member therein. Additionally, the position indicator apparatus of the subject invention avoids the problems of inaccurate reading due to parallax or improper alignment of the viewer with the sight glass on the prior art valve. Additionally, the position indicator apparatus of the subject invention enables the technician to virtually simultaneously assess the relative positions of a plurality of valves to ensure proper sequencing of valves throughout a system.

BRIEF DESCRIPTION OF THE INVENTION

FIG. 1 is a front elevational view of the position indicator apparatus of the subject invention mounted to a rising stem valve which is in a closed condition.

FIG. 2 is a front elevational view of the position indicator apparatus of the subject invention mounted to a rising stem valve which is in a opened condition.

DETAILED DESCRIPTION OF THE PREFERRED EMBODIMENT

Figure 3:
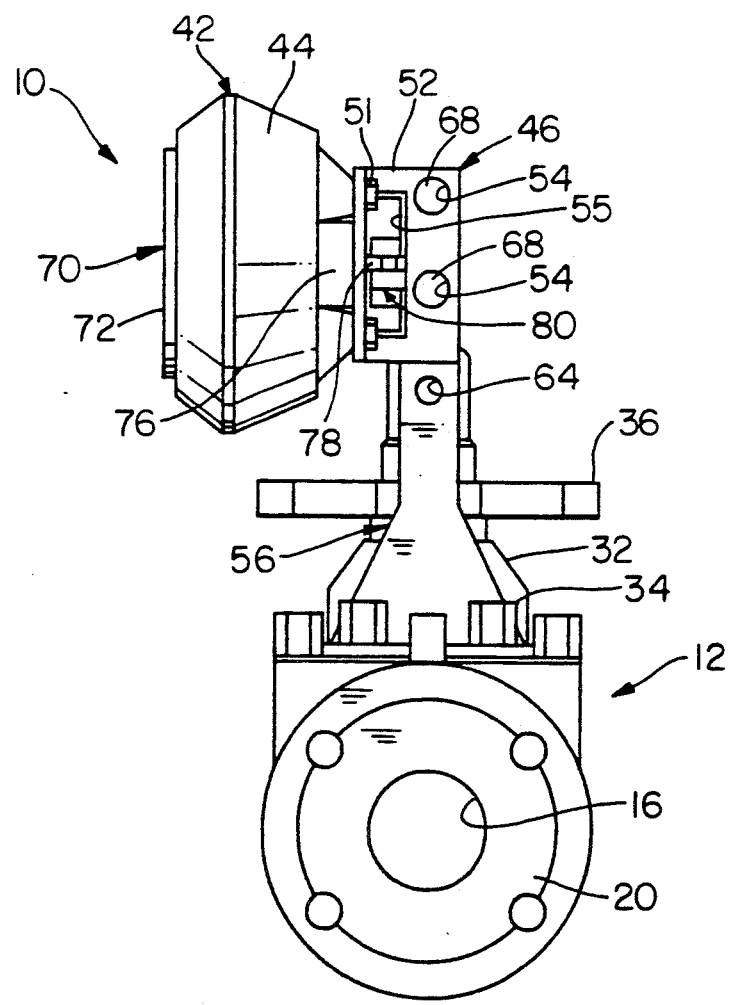
FIG. 3 is a side elevational view of the position indicator apparatus of the subject invention mounted to a rising stem valve.

A position indicator apparatus in accordance with the subject invention is identified generally by the numeral 10 in FIGS. 1-3. The position indicator apparatus 10 is employed with a rising stem fluid control valve 12, which in the embodiment depicted herein is a diaphragm valve. However, the position indicator apparatus 10 can be used with other rising stem valves. As explained in detail herein, the position indicator apparatus 10 is operative to generate a signal which indicates the opened or closed position of the rising stem valve 12.

The rising stem valve 12 includes an elongated housing 14 having a fluid flow passage 16 extending therethrough from a first end 18 of the valve housing 14 to the second end 20 thereof. An elastomeric diaphragm 22 is mounted in the valve housing 14 intermediate the opposed ends 18 and 20 thereof. The diaphragm 22 is operative to selectively block or open the fluid flow passage 16 through the valve housing 14. In particular, as shown in FIG. 1, the diaphragm 22 can be urged into a position where the fluid flow passage 16 through the valve housing 14 is completely blocked. Alternatively, as shown in FIG. 2, the diaphragm 22 can be moved into a position where the fluid flow passage 16 is substantially completely opened. It will be appreciated that the diaphragm 22 can assume various intermediate positions between the fully closed position and the fully opened position depicted in FIGS. 1 and 2 respectively.

Movement of the diaphragm 22 is generated by a valve stem 24. The valve stem 24 is an elongated member having an inner end 26 connected to the diaphragm and an outer end 28 disposed external of the valve housing 14. The valve stem 24 is further provided with an array of threads 30 intermediate its length. The valve stem 24 is aligned to extend generally orthogonal to the fluid flow passage 16 such that translation of the valve stem 24 in its axial direction will move the diaphragm 22 into our out of the fluid flow passage 16. The valve stem 24 is retained in its orthogonal alignment relative to the fluid flow passage 16 by a bonnet 32 which is secure the valve housing 14 by array of bolts 34.

The diaphragm valve 12 is further provided with an actuator wheel 36 having an array of internal threads 38 which are threadedly engaged with the external threads 30 on the valve stem 24. The actuator wheel 36 is rotatably mounted to the bonnet 32, but is prevented from movement along the longitudinal axis about which the internal threads 38 thereof are generated. As a result of the threaded engagement of the actuator wheel 36 with the valve stem 24, rotation of the actuator wheel 36 will generate an axial movement of the valve stem 24. In particular, the actuator wheel 36 can be rotated to move the valve stem 24 into the valve housing 14. This inward movement of the valve stem 24 causes the diaphragm 22 to close the fluid flow passage 16. Conversely, the actuator wheel 36 can be rotated to move the valve stem 24 out of the valve housing 14. Outward movement cf the valve stem 24 causes the diaphragm 22 to open the fluid flow passage 16 as shown in FIG. 2. The amount of rotation of the actuator wheel 36 that is required to move the diaphragm from the fully closed position shown in FIG. 1 to the fully open position shown in FIG. 2 depends upon the pitch of the inter-engaged threads 30 and 38 of the valve stem 24 and the actuator wheel 36 respectively.

The position indicator apparatus 10 includes a switch housing 40 in which electrical switching and signaling means are disposed. The housing 40 includes a generally planar base wall 42 and a plurality of upstanding side walls 44 extending from the base wall 42 and consecutively connected to one another. The housing 40 encloses the electrical switching components of the position indicator apparatus as explained further herein.

The switch housing 40 is mounted to the valve housing 14 by a plurality of brackets. More particularly, the position indicator apparatus 10 includes a generally L-shaped switch housing bracket 46 having a generally planar mounting leg 48 with a plurality of mounting apertures 50 extending therethrough. Bolts 51 are provided to pass through the mounting apertures 50 for connecting the mounting leg 48 of the switch housing bracket 46 to the base wall 42 of the switch housing 40. The switch housing bracket 46 further includes a connecting leg 52 extending orthogonally from the mounting leg 48. The connecting leg 52 is provided with a plurality of mounting apertures 54 extending therethrough, and an access slot 55 as shown in FIG. 3.

An L-shaped valve housing bracket 56 is provided to properly position and securely connect both the switch housing 40 and the switch housing bracket 46 relative to the valve housing 40. The L-shaped valve housing bracket 56 includes a mounting leg 58 having a plurality of apertures 60 extending therethrough and disposed for registration with a plurality of the bolts 34 which connect the valve bonnet 32 to the valve housing 14. Thus, the mounting leg 58 of the L-shaped valve housing bracket 56 can be securely mounted to the valve housing 14 by the bolts 34. The L-shaped valve housing bracket 56 further includes a connecting leg 62 extending orthogonally from the mounting leg 58. The connecting leg 62 is aligned substantially parallel to the valve stem 24 as shown most clearly in FIGS. 1 and 2. The connecting leg 62 is provided with a plurality of apertures 64 extending therethrough and disposed to register with the apertures 54 in the connecting leg 52 of the switch housing bracket 46.

Bolts 68 pass through the apertures 54 and 64 in the connecting legs 52 and 62 of the switch housing bracket 46 and the valve housing bracket 56 respectively. Thus, the switch housing 40 is securely positioned relative to the valve housing 14. In the embodiment illustrated herein, the planar base wall 42 of the switch housing 40 is aligned substantially parallel to the valve stem 24 and parallel to the longitudinal axis of the fluid flow passage 16 of the valve housing 14.

A signal apparatus identified generally by the numeral 70 is mounted in the switch housing 40. The signal apparatus 70 includes a light 72 as shown in FIG. 3 and an internal power source 74 for providing the power to illuminate the signal light 72. In some embodiments, however, an external power source will be provided in place of the internal power source 74. In other embodiments, the signal light 72 may be by an alternate signal means that may be disposed either on the switch housing 40 or at a remote location, such as in a control room. The switch housing 40 further includes a switch 76 mounted therein. The switch 76 is connected to both the power source 74 and the signal light 72 and is operative to selectively complete a circuit therebetween. More particularly, a switch 76 includes a pivotable switch post 78 which projects orthogonally through the planar base wall 42 of the switch housing 40 and through the mounting leg 48 of the switch housing bracket 46. The pivoting switch post 78 of the switch 76 is operative to complete the circuit between the signal light 72 and the power source 74 in a first rotational orientation thereof, and to break the circuit between the signal light 72 and the power source 74 in a second rotational orientation of the switch post 78. The switch 76 may be adjustable such that the range of rotational movements of the switch post 78 that are required to complete or break the circuit between the power source 74 and the signal light 72 can be adjusted.

The position indicator apparatus 10 further includes an adjustable connecting beam 80 extending from the switch post 78, through the access slot 55 in the connecting leg 52 of the switch bracket 46 and to the outer end 28 of the valve stem 24. The adjustable connecting beam 80 includes a first end 82 having a slot 84 for non-rotatably engaging the switch post 78. A fastening means 86, such as a bolt, cotter pin or the like securely retains the first end 82 of the connecting beam 80 onto the switch post 78. A longitudinally extending slot 88 is formed within the connecting beam and extends from a location in proximity to the second end 90 thereof to a location intermediate the opposed ends 82 and 90. The slot 88 is dimensioned and configured to pivotably and slidably receive a pin 92 mounted to the outer end 28 of the valve stem 24.

In operation, rotation of the actuator wheel 36 will cause the internal threads 38 thereof to cooperate with the threads 30 of the valve stem 24 to move the valve stem 24 into or out of the valve housing 14. This axial translation of the valve stem 24 will cause the connecting pin 92 at the outer end 28 thereof to pivot within the slot 88 of the connecting beam 80 and to move longitudinally in the slot 88. As noted above, the first end 82 of the connecting beam 80 is rigidly non-rotatably mounted to the switch post 78. Thus, the movement of the valve stem 24 into our out of the valve housing 14 and the pivoting and sliding movement permitted by the pin 92 within the slot 88 of the connecting beam 80 causes the entire connecting beam 80 to pivot about the axis of rotation of the switch post 78. The pivoting movement of the switch post 78 will cause the switch 76 to either complete or break the circuit between the power source 74 and the signal light 72. In this manner, a signal will be generated depending upon the amount of axial advancement of the valve stem 24 relative to the valve housing 14.

The position indicator apparatus 10 provides several significant efficiencies in addition to providing the important signaling function. In particular, the position indicator apparatus 10 is readily adaptable to any of a plurality of different rising stem valves of different dimensions. In this regard, the valve housing bracket 56 depicted herein need merely be replaced with one of suitable dimensions for fitting a valve that is larger or smaller then the valve 12 depicted in FIGS. 1–3. Additionally, the valve housing bracket 56 can be selected to position the signaling means in the most desireable position for the particular application. In a similar manner, the connecting beam 80 is well suited to valves of different dimensions. If the length of the slot 88 within the connecting beam 80 is not sufficiently long to accommodate a particular valve, the connecting beam 80 can readily be replaced with one of more appropriate dimensions. Still further, the position indicator apparatus 10 is well suited for use with valves having an automated actuator in place of the manual actuator wheel 36. In such embodiments, the signal light 72 may be replaced with signal means disposed at a control location form which various signaling combinations can be simultaneously checked.

While the invention has been described with respect to a preferred embodiment, it is apparent that various changes can be made without departing from the scope of the invention as defined by the appended claims. For example, the position indicator apparatus of the subject invention may be used with rising stem valves other that the diaphragm valve depicted herein. Similarly, the position indicator apparatus may be used with either manually operated rising stem valves or automatically operated rising stem valves. The power source and signaling means may vary from the particular embodiments shown and described above. In this regard, external power sources and/or other signaling means may be provided. The particular configuration and dimensions of the brackets, connecting beams and housings also can be changed in accordance with demands of a particular system.

I claim:

1. A position indicator apparatus for a rising stem valve, the valve including a valve housing having a fluid flow passage extending therethrough, a valving member disposed in the housing for selectively and alternately opening and blocking the fluid flow passage, a valve stem connected to the valving member and extending orthogonal to the fluid flow passage and through the valve housing such that movement of the valve stem into and out of the valve housing moves the valving member into and out of the fluid flow passage, actuator means mounted to the valve stem for selectively moving the valve stem into and out of the valve housing, said position indicator apparatus comprising:

signal means for selectively generating a signal;

power means operatively connected to the signal means for providing power to operate the signal means;

switch means mounted in fixed relationship to the valve housing and being operatively connected to the power means and the signal means, the switch means including a switch post spaced from the valve stem and orthogonal thereto, the switch post being selectively pivotable about an axis orthogonal to the valve stem from a first position for completing a connection between the power means and the signal means to a second position for breaking a connection between the power means and the signal means; and a rigid connecting beam having opposed ends, one end of the connecting beam being rigidly connected to the switch post of the switch means for pivoting movement with the switch post about an axis orthogonal to the valve stem, the connecting beam being pivotally and slidably connected to the valve stem of the valve at a location between the opposed ends of the connecting beam, such that said connecting beam moves with the valve stem and moves the switch post from the first position thereof when the valve stem is in a first position to the second position of the switch post when the valve stem is in a second position, such that movement of the valve stem is operative to generate a signal by the signal means.

2. A position indicator apparatus as in claim 1, wherein the power means is an electric power source.

3. A position indicator apparatus as in claim 2, wherein the signal means comprises at least one light operatively connected to the electrical power source.

4. A position indicator apparatus as in claim 1 further comprising a switch housing rigidly mounted in fixed spaced relationship to the valve housing, the switch means being securely mounted to the switch housing.

5. A position indicator apparatus as in claim 4 wherein the signal means is mounted to the switch housing.

6. A position indicator apparatus as in claim 5, wherein the power means is mounted to the switch housing.

7. A position indicator apparatus as in claim 4 further comprising bracket means for securely retaining the switch housing in fixed spaced relationship to the valve housing.

8. A position indicator apparatus as in claim 7, wherein the bracket means comprises a switch housing bracket mounted to the switch housing and a valve housing bracket mounted to the valve housing, the switch housing bracket being adjustably mounted to the valve housing bracket.

9. A position indicator apparatus as in claim 1, wherein the connecting beam includes an elongated slot therein, and wherein the valve stem includes a pin slidably and pivotably engaged in the slot, such that movement of the valve stem into or out of the valve housing generates a pivoting and sliding movement between the connecting beam and the pin of the valve stem.

10. A position indicator apparatus for a rising stem valve, the valve including a valve housing having a fluid flow passage extending therethrough, a valving member disposed in the housing for selectively and alternately opening and blocking the fluid flow passage, a valve stem connected to the valving member and passing through the valve housing such that movement of the valve stem into and out of the valve housing moves the valving member, actuator means mounted to the valve housing for selectively moving the valve stem into and out of the valve housing, said position indicator apparatus comprising:

an L-shaped valve housing bracket having a mounting leg securely mounted to the valve housing and a connecting leg extending from the valve housing substantially parallel to the valve stem;

an L-shaped switch housing bracket having a mounting leg and a connecting leg, the connecting leg of the switch housing bracket being rigidly connected to the connecting leg of the valve housing bracket;

a switch housing securely mounted to the mounting leg of the switch housing bracket;

a switch mounted in the switch housing and having a switch post projecting therefrom, said switch post being pivotable from a first position to a second position; and a connecting beam having opposed first and second ends, the first end being connected to the switch post of the switch and the second end being pivotably connected to the valve stem, such that movement of the valve stem generates a pivoting movement of the connecting beam and the switch post.

11. A position indicator assembly as in claim 10 further comprising a signal operatively connected to the switch such that the switch completes a circuit to the signal in a first position of the switch post and breaks a circuit to the signal in a second position of the switch.

12. A position indicator assembly in claim 11 further comprising a power source operatively connected to both the signal and the switch.

13. A position indicator assembly as in claim 12 wherein the power source is a battery mounted in the switch housing.

14. A position indicator assembly as in claim 10 wherein the connecting leg of the switch housing bracket is mountable to the connecting leg of the valve housing bracket in each of a plurality of different locations.

15. A position indicator apparatus as in claim 10, wherein the switch is an adjustable switch enabling different rotational orientations for the selective completion and breaking of the circuit to the signal.

* * * * *